E. R. DRAVER.
FEEDING DEVICE.
APPLICATION FILED DEC. 1, 1921.
1,415,319.
Patented May 9, 1922.
3 SHEETS—SHEET 1.
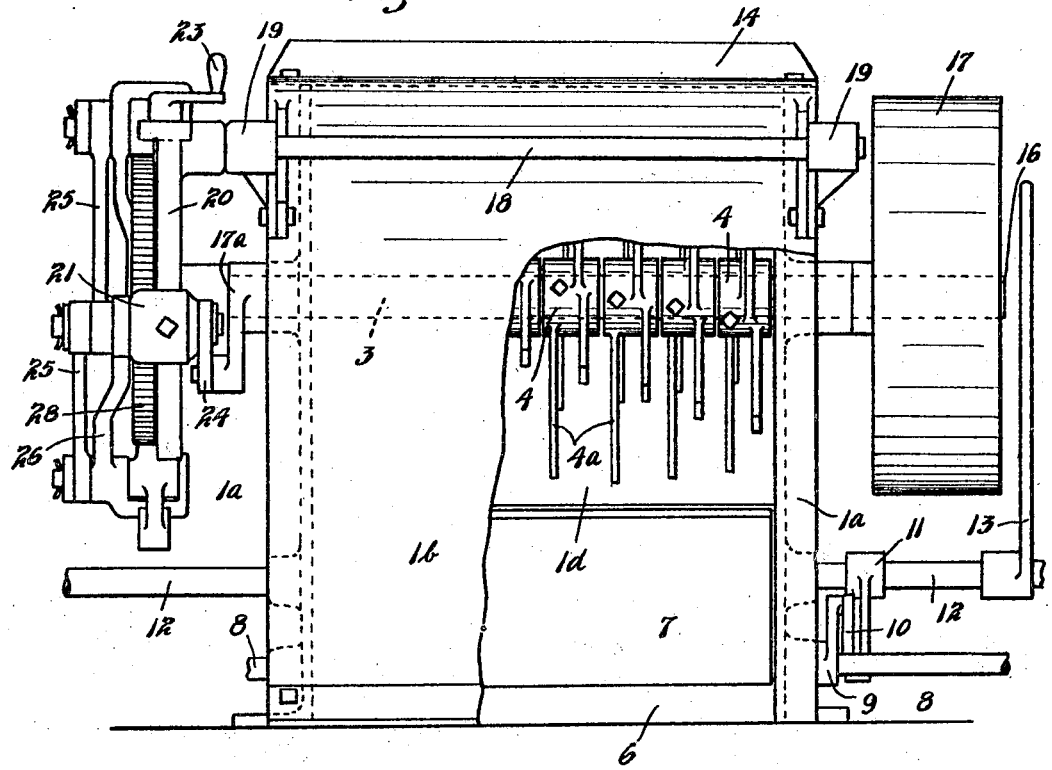
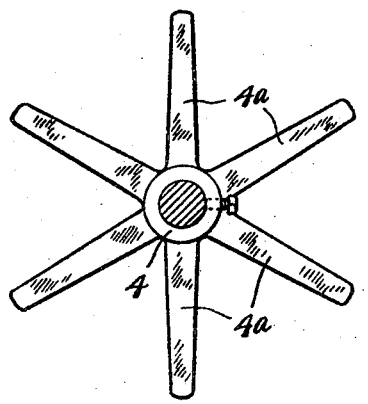
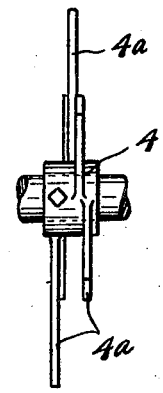
INVENTOR.
EMIL R. DRAVER.
BY HIS ATTORNEY.
James J. Williamson

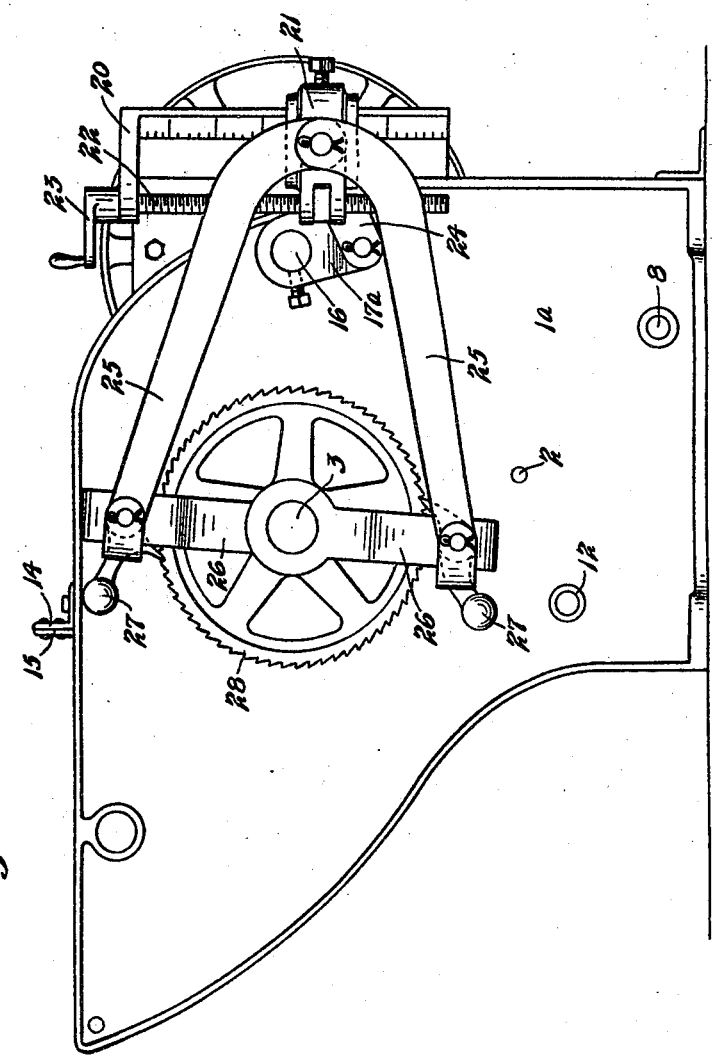

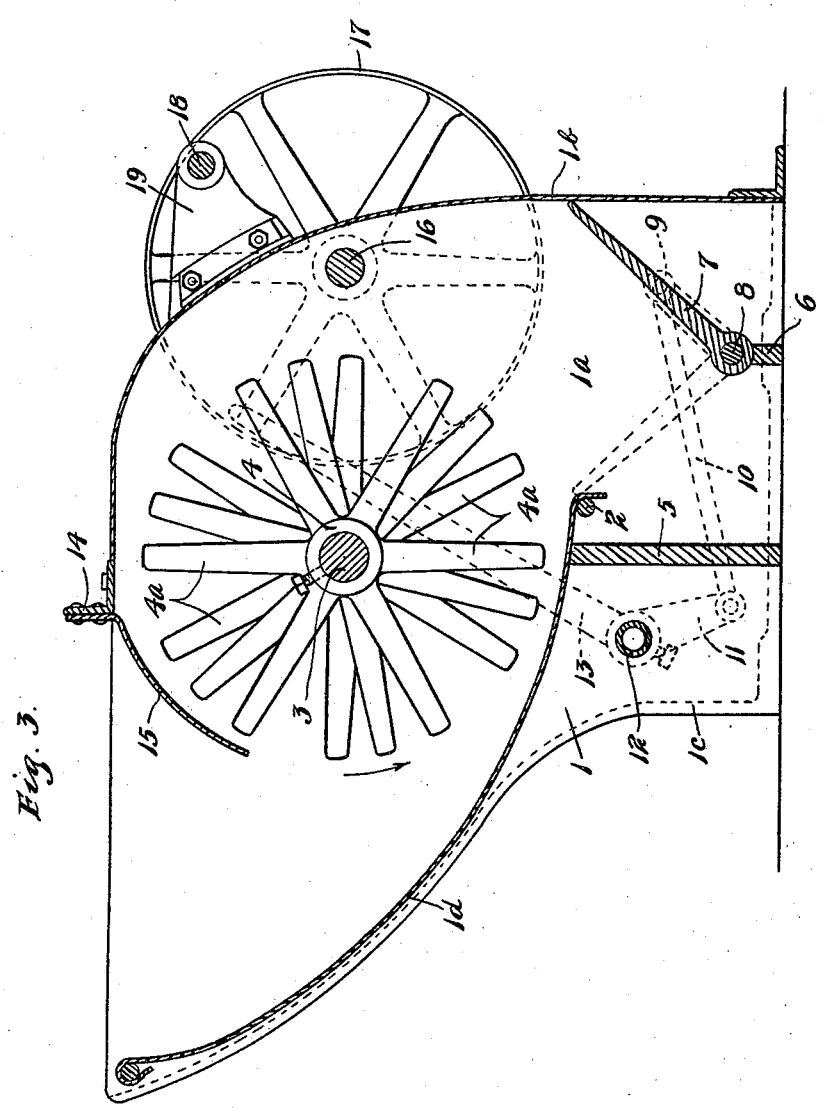

UNITED STATES PATENT OFFICE.

EMIL R. DRAVER, OF RICHMOND, INDIANA, ASSIGNOR TO B. F. GUMP COMPANY, OF CHICAGO, ILLINOIS, A CORPORATION OF ILLINOIS.

FEEDING DEVICE.

1,415,319.   Specification of Letters Patent.   Patented May 9, 1922.

Application filed December 1, 1921. Serial No. 519,262.

*To all whom it may concern:*

Be it known that I, EMIL R. DRAVER, a citizen of the United States, residing at Richmond, in the county of Wayne and State of Indiana, have invented certain new and useful Improvements in Feeding Devices; and I do hereby declare the following to be a full, clear, and exact description of the invention, such as will enable others skilled in the art to which it appertains to make and use the same.

This invention relates to a feeding device of the type used especially for feeding granular or ground material, such as grain, flour, ground feed, of various kinds, and the like, in predetermined quantities which can be varied at will.

It is an object of this invention to provide such a feeder having a casing with an inlet chamber, the bottom of which slopes inwardly and downwardly and having a feeding device comprising radially projecting spaced arms which are rotated downwardly in the inlet chamber toward the bottom thereof.

It is also an object of the invention to have said arms mounted on separate short hubs which are secured to a shaft passing transversely through the casing.

It is a still further object of the invention to have a plurality of arms on each of said hubs, which arms are circumferentially spaced and helically arranged longitudinally of the hub, the rows of arms on the successive hubs being also helically arranged.

These and other objects and advantages of the invention will be fully set forth in the following description made in connection with the accompanying drawings, in which like reference characters refer to the same parts, and in which, Fig. 1 is a view in front elevation of the device, a portion of the casing thereof, being broken away;

Fig. 2 is a view in side elevation, as seen from the left of Fig. 1;

Fig. 3 is a vertical section through the device;

Fig. 4 is a view of one of the hubs of the feeder mounted on its shaft; and

Fig. 5 is a view in side elevation as seen from the left of Fig. 4.

Referring to the drawings, the device comprises a casing designated generally as 1, which has parallel side walls $1^a$, a curved rear wall $1^b$, and a curved front wall $1^c$. The front wall $1^c$ curves inwardly and downwardly, and together with the side walls, forms an inlet or receiving chamber of the casing. The bottom of this inlet chamber is formed by a curved plate $1^d$ shown in Fig. 3 as having its upper edge bent around and supported by a transverse rod passing through the casing and having its inner edge terminating abruptly in a short downwardly extending portion resting upon another rod 2 passing transversely through the casing. A shaft 3 passes transversely through the casing and the side walls $1^a$ which are provided with outwardly extending hubs forming a bearing therefor. Secured to the shaft 3 between the side walls $1^a$, by suitable set screws, is a plurality of hub members 4. Each of the members 4 has projecting therefrom a plurality of arms $4^a$ shown in the particular embodiment illustrated as six in number. These arms are comparatively thin and of narrow width and are equally spaced circumferentially and disposed progressively in helical arrangement about the hub 4, as clearly shown in Figs. 1 and 4. The hub members are arranged in close proximity on the shaft 3 and the arms $4^a$ of the successive members are arranged in helical formation longitudinally of said shaft, as shown in Fig. 1. The shaft 3 is disposed approximately midway between the top of the portion $1^b$ of the casing and the bottom of plate $1^d$ and is substantially alined vertically with the end of the plate $1^d$.

As clearly illustrated in Fig. 3, the rear wall $1^b$ of the casing extends horizontally between the side walls $1^a$ directly above the shaft 3 and is then curved downwardly and rearwardly away from said shaft and extends vertically downward at some distance from the end of the wall $1^d$. A vertical wall 5 extends downwardly from the wall $1^d$ some distance forward of its inner edge and this, together with the vertically extending portion of the wall $1^b$, forms the discharge passage for the material. A transverse rib 6 extends through the casing approximately midway between the end of the wall $1^d$ and the wall $1^b$, and has pivoted thereabove a swinging valve 7 adapted to swing into contact with wall $1^b$ or into contact with the end of wall $1^d$. This valve is mounted on a shaft 8 projecting at one end of the casing and having thereon an arm 9 connected by a link 10 to another arm 11 mounted on a shaft 12 extending through the casing. This shaft carries an arm or lever handle 13 by which the shaft 12 can be turned and the valve 7 swung from one position to the other or to a desired intermediate position. As the feeding devices are frequently mounted in a row to form a battery, the shafts 8 and 12 are shown in Fig. 1 as extending entirely through the feeder so that they can be connected to several feeders. The wall 1$^b$ is shown as terminating at an upwardly extending angle member 14 at the top of the casing and a curved shield or partition 15 extends forwardly and downwardly circumferentially of the shaft 3 to some distance into the inlet chamber of the casing.

The shaft 3 and the feeding devices thereon are arranged to be intermittently rotated and for this purpose a double-acting ratchet mechanism is provided. This mechanism is placed at one side of and below the top of the casing and comprises the following mechanism. A shaft 16 extends transversely of the casing and is journaled in hubs projecting from the sides 1$^a$. This shaft has, at one side of the casing, a pulley 17 adapted to be driven from a suitable source of power and said shaft has, at its other end, a crank arm 17$^a$. A rock shaft 18 extends transversely of the casing outside thereof and is journaled in brackets 19 secured to lugs projecting from the casing. This shaft has secured thereto, a straight edged and preferably graduated crank arm 20. Mounted to slide upon this arm is a cross head 21 adjustable along the arm by a screw 22 rotatably mounted in an extension at one end of the arm and provided with a crank handle 23. This screw works with threaded engagement through a non-rotary nut carried between arms on the crosshead 21 and the crosshead 21 is connected by a link 24 with the crank arm 17$^a$ which is mounted on shaft 16. Links 25 are pivoted to and connect the crosshead 21 to arms 26 which are independently pivoted on the projecting end of the shaft 3. The arms 25 have pivoted thereto weighted dogs 27 provided with pawls adapted to engage at opposite sides with the ratchet wheel 28 secured to the projecting end of the shaft 3. With the above described structure it is apparent that when the pulley 17 is rotated, the arm 20 will be oscillated and the ratchet wheel and shaft 3 will be intermittently rotated through the dogs 27.

The operation of the feeding device will be apparent from the above description.

The material to be distributed and fed is placed in the casing 1 in the inlet chamber. The arms 4$^a$ and shaft 3 are intermittently rotated at the desired speed, depending on the adjustment of the crosshead 21, on the arm or slide 20. The material will be stirred and loosened or disintegrated and will be evenly fed or distributed by the arms 4$^a$ and discharged over the lower edge of the plate 1$^d$. By means of the valve 7, the material can be discharged to two different devices. The helical arrangement of the arms 4$^a$ on the hub 4 and the arrangement of the successive members 4 and the arms 4$^a$ thereof will result in all parts of the material in the casing being acted upon by said arms and the said material will be evenly stirred and fed through the discharge passage. The shield 15 will prevent any material from passing up over the top of the arms 4$^a$ into the discharge passage. The hubs 4 can, of course, be readily adjusted angularly on the shaft 3 by their fastening set screws. The feeding device, as above constructed, has been found to give excellent results in handling flour and ground feed and the use of such arms arranged as disclosed herein in a mill feeder is novel.

It will, of course, be understood that various changes may be made in the form, details and arrangement of the device without departing from the scope of applicant's invention, which generally stated, consists in the matter shown and described and set forth in the appended claims.

What is claimed is:

1. A mill feeder having in combination, a casing having an inlet chamber with a downwardly and inwardly curved bottom terminating with an abrupt inner edge, a rotatable feeding member in said casing comprising a shaft extending therethrough substantially vertically alined with said edge, a plurality of short hub members secured to said shaft, each having a plurality of radially extending arms thereon, the ends of which pass in close proximity to said bottom, and means for rotating said shaft to move said arms downwardly through said inlet chamber towards the said edge.

2. The structure set forth in claim 1, the said casing having a portion extending circumferentially of said shaft over the top of said arms, a substantial distance into the inlet chamber, and also having a portion extending progressively away from the arms from the top thereof in a downwardly curved surface which continues vertically downward at some distance from said arms to form one side of a discharge passage in the casing.

3. A mill feeder having in combination a casing having inlet and discharge passages, the bottom of said inlet passage sloping inwardly and downwardly, a shaft extending therethrough, a plurality of feeding members on said shaft, each comprising a short hub having a plurality of radially extending equally spaced arms, and means for rotating said arms downwardly through said inlet chamber to feed the material.

4. The structure set forth in claim 3, the arms on the respective hubs being arranged in helically extending rows longitudinally of said shaft.

5. The structure set forth in claim 3, the arms on each hub being helically arranged longitudinally thereof and the arms on the successive hub members being arranged in helical rows longitudinally of said shaft.

6. A mill feeder having in combination a casing having inlet and discharge passages, the bottom of said inlet passage terminating abruptly in an edge extending across said casing, a feeding device disposed between said inlet and discharge passages and comprising a shaft extending through said casing and having secured thereto a plurality of equally spaced rows of radially extending arms, and means for rotating said shaft and arms downwardly through said inlet passage in close proximity to the edge of the bottom thereto to feed the material over said edge, said inlet passage being disposed entirely at one side of said feeding device.

In testimony whereof I affix my signature.

EMIL R. DRAVER.